(12) United States Patent
Kim

(10) Patent No.: US 8,611,084 B2
(45) Date of Patent: Dec. 17, 2013

(54) MOBILE COMMUNICATION TERMINAL WITH MOVABLE BUTTONS

(75) Inventor: Sebastian Kim, Seoul (KR)

(73) Assignee: Pantech Co., Ltd., Seoul (KR)

( * ) Notice: Subject to any disclaimer, the term of this patent is extended or adjusted under 35 U.S.C. 154(b) by 164 days.

(21) Appl. No.: 13/346,447

(22) Filed: Jan. 9, 2012

(65) Prior Publication Data

US 2012/0193209 A1    Aug. 2, 2012

(30) Foreign Application Priority Data

Jan. 31, 2011 (KR) .................. 10-2011-0009479

(51) Int. Cl.
*G06F 1/16* (2006.01)

(52) U.S. Cl.
USPC .............. 361/679.56; 455/550.1; 348/231.99; 16/244

(58) Field of Classification Search
USPC ............... 455/566, 575.3, 575.4, 550.1, 158, 455/26.1, 41.1; 348/333.07, E4.025, 348/333.01, 231.99; 361/679.07, 679.01, 361/679.06, 679.27, 679.23, 679.09, 361/679.55, 679.26, 679.08, 679.21, 361/679.58, 679.03; 16/354, 367, 275, 371, 16/297, 244; 381/379, 383, 74; 200/512, 200/520, 332.1, 50.25, 345, 533, 296; 345/158, 169, 204, 156, 163, 173
See application file for complete search history.

(56) References Cited

U.S. PATENT DOCUMENTS

| | | | | |
|---|---|---|---|---|
| 7,333,840 | B2 * | 2/2008 | Heikkinen | 455/575.3 |
| 8,180,416 | B2 * | 5/2012 | Park et al. | 455/575.4 |
| 2008/0132284 | A1 * | 6/2008 | Ryu et al. | 455/566 |

FOREIGN PATENT DOCUMENTS

EP    2 063 610    5/2009

* cited by examiner

*Primary Examiner* — Hung Duong
(74) *Attorney, Agent, or Firm* — H.C. Park & Associates, PLC (57) ABSTRACT

A mobile communication terminal includes a body and a front portion; the body including a button portion with button actuators protruding on a lower surface thereof and a board disposed below the button portion and with switches protruding on an upper surface thereof. The button portion and/or the board are slidable with respect to the body if the front portion is moved. The switches are horizontally arranged in parallel with respect to the button actuators with the button actuators in a closed state. The switches are vertically arranged in series with respect to the button actuators in and open state.

12 Claims, 11 Drawing Sheets

MOBILE COMMUNICATION TERMINAL WITH MOVABLE BUTTONS

CROSS-REFERENCE TO RELATED APPLICATION

This application claims priority from and the benefit under 35 U.S.C. §119(a) of Korean Patent Application No. 10-2011-0009479, filed on Jan. 31, 2011, which is incorporated by reference for all purposes as if fully set forth herein.

BACKGROUND

1. Field

This disclosure relates to a mobile communication terminal, and more particularly to a mobile communication terminal in which a button portion is vertically movable to an open/close state.

2. Discussion of the Background

Mobile communication terminals may be classified into folder-type terminals, sliding-type terminals, rotating-type terminals, sliding-tilting type terminals, and so on, based on their structures. Sliding-type terminals may be preferred due to a simple structure and a thin design.

Generally, a sliding-type terminal may include a button portion as part of a body, and an electronic board to generate a signal based on the operation of the button portion.

The button portion has a plurality of buttons that may be activated, and button actuators are provided at the lower surface of the button portion so that the button actuators may contact the board. Switches arranged in series and/or perpendicular to the button actuators are located on the board.

If a button is activated, the button actuator activates the switch located at the lower end thereof to make an electrical short-circuit with the board so that data is transmitted.

In the above technique, the button actuators and the switches, which add to the thickness of a cellular phone, are vertically arranged in series.

In addition, in order for the button portion to not disturb the operation of the front portion while the front is being slid to open or close the body, a surface of the button portion should not protrude as to be in contact with a surface of the front portion. Thus, the button portion should subside into the body, making it inconvenient to manipulate the buttons on the button portion.

SUMMARY

This disclosure is directed to providing a mobile communication terminal with a button portion, with actuators and switches that may be arranged horizontally/parallel or vertically/series based on an open/close state of the terminal.

Additional features of the invention will be set forth in the description which follows, and in part will be apparent from the description, or may be learned by practice of the invention.

An exemplary embodiment provides a mobile communication terminal, with a front potion; a body that includes: a button portion with a button actuator protruding on a surface of the button portion that faces the body; a board disposed in between the button portion and the body, and a switch disposed on the board to face the button portion, wherein the button portion and the board are coupled with the body, and slide with respect to the body if the front portion is slid, and wherein the switch and the button actuator are horizontally arranged and parallel with each other if the front portion and the body are at a closed state, and the switch and the button actuator are vertically arranged and in series with each other, if the front portion and the body are in an open state, and wherein the button portion is vertically movable with respect to the body according the open/closed state.

An exemplary embodiment provides a moveable button portion for a device, including: a button attached to the moveable button portion at a first state of the device; and a leaf shaped coupling body to couple the button portion to the device, wherein the button comprises an actuator of a same shape of a switch of the device corresponding to the actuator, and the actuator and switch being horizontal and in parallel with each other in the first state, and if the device transitions from a first state to a second state, the moveable button portion also moves and the switch and the actuator become vertical and in series with each other.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION OF THE ILLUSTRATED EMBODIMENTS

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1:
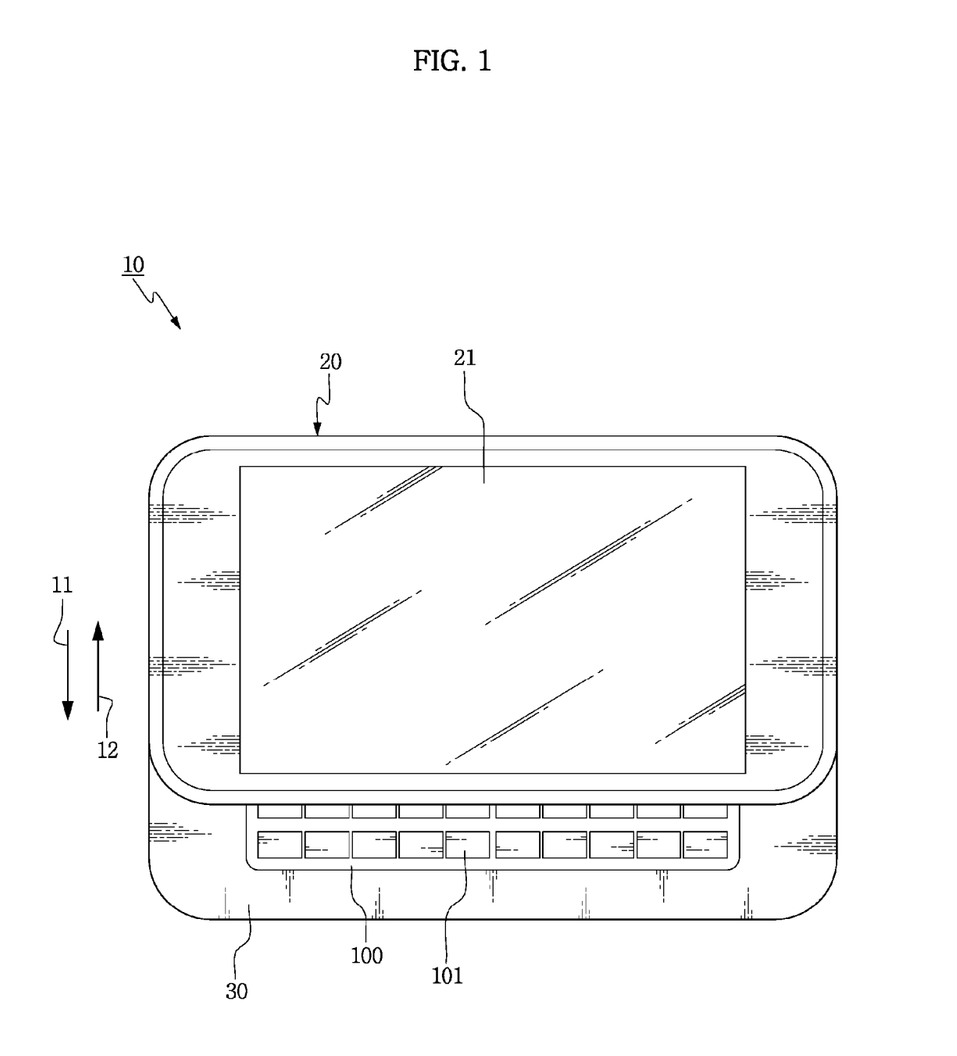
FIG. 1 is a plan view of a mobile communication terminal according to an exemplary embodiment.

FIG. 1 is a plan view of a mobile communication terminal according to an exemplary embodiment.

The mobile communication terminal 10 is a sliding-type terminal, in which a front portion 20 is slidably coupled to a body 30, and may slide relative to the body 30.

A direction 11 in which the front portion 20 moves to close the mobile communication terminal 10, thereby hiding the body 30, is defined as a "backward" direction, and a direction 12 in which the front portion 20 moves to open the mobile communication terminal 10, thereby exposing the body 30, is defined as a "forward" direction. For example, in FIG. 1, the "forward" direction of the front portion 20 is an upward direction, and the "backward" direction of the front portion 20 is a downward direction.

A display 21 that displays various content, such as images and the like, is mounted to the front portion 20. Various electronic circuitry is also located in the front portion 20, and may also include a front portion button portion (not shown).

A button portion 100 is provided on the body 30 so that the button portion 100 is exposable on the body 30. The button portion 100 has a plurality of buttons 101 that may be activated. The button portion 100 may be in the form of a QWERTY type computer keyboard; however, is not limited to this form.

Figure 2A:
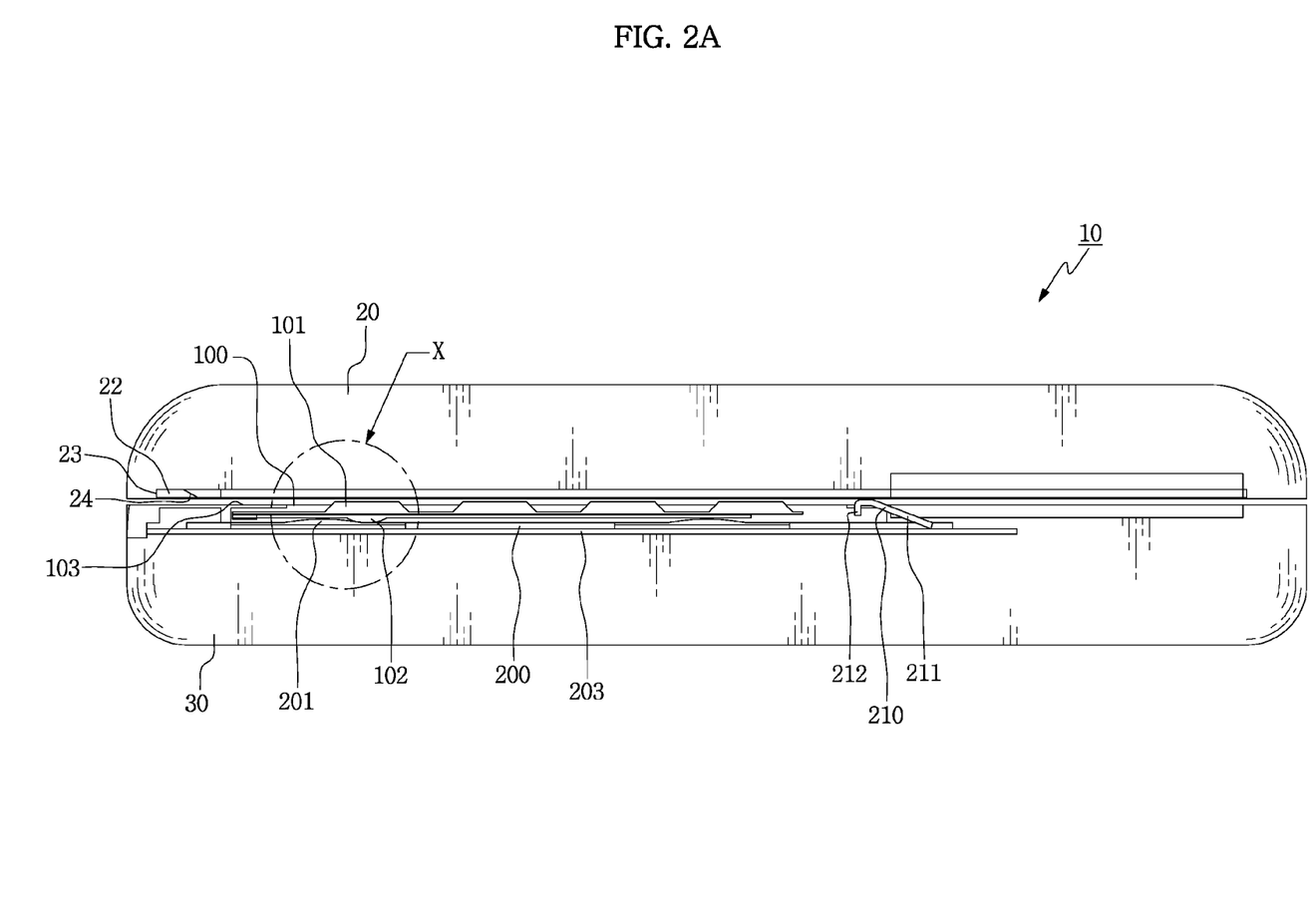
FIG. 2A is a side view of the mobile communication terminal according to an exemplary embodiment.
Figure 2B:
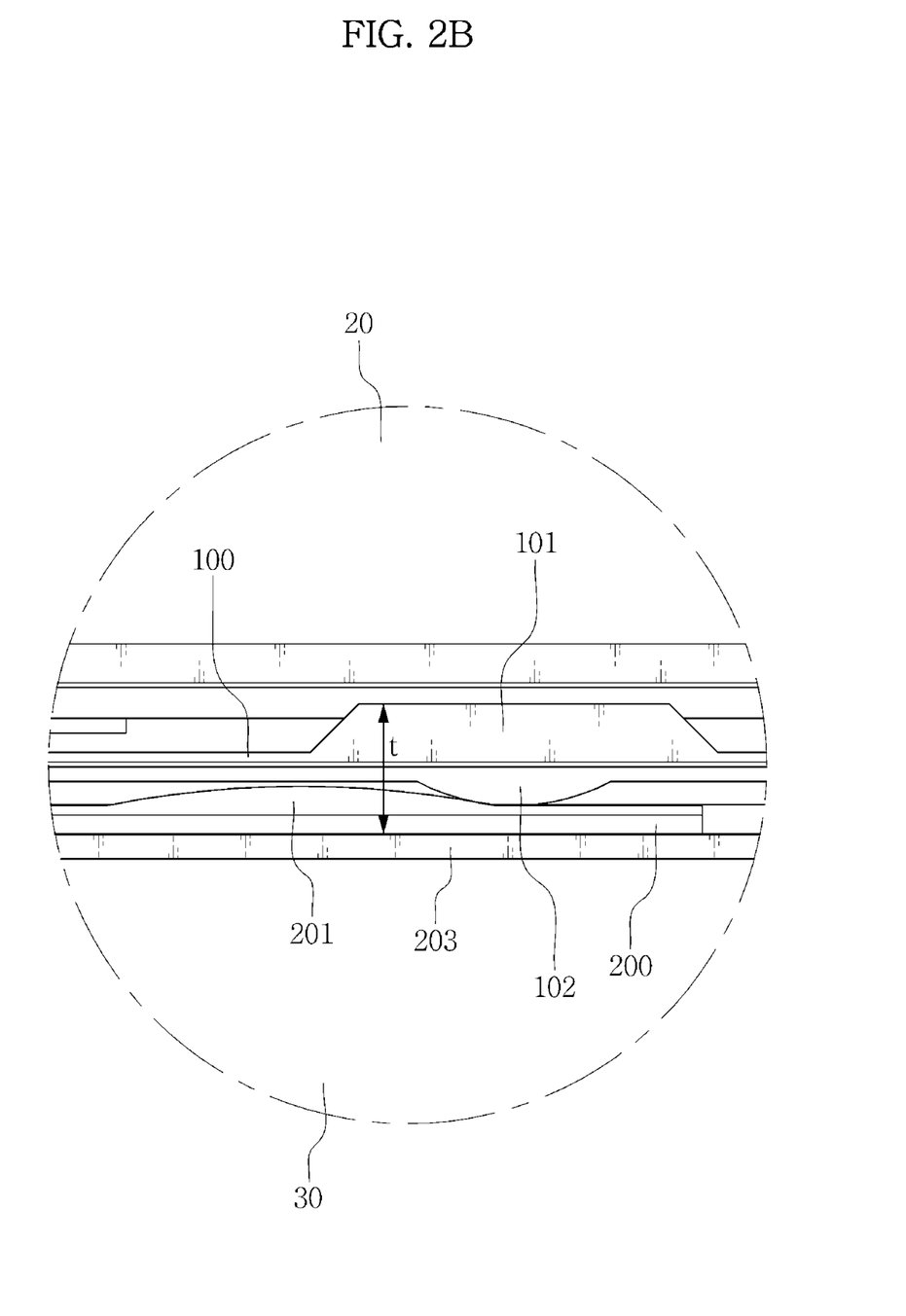
FIG. 2B is an enlarged view of a portion of a side view of the mobile communication terminal according to an exemplary embodiment.

FIG. 2A is a side view of the mobile communication terminal according to an exemplary embodiment, and FIG. 2B is an enlarged view of a portion of a side view of the mobile communication terminal according to an exemplary embodiment.

Referring to FIG. 2A, the body 30 has the button portion 100 on a surface adjacent to a surface of the front portion 20. The button portion 100 has a plurality of buttons 101. Button actuators 102 are provided to convexly protrude in between the respective plurality of buttons 101 and the body 30. An end of the button portion 100 is fixed to a lower surface 103.

Referring to FIG. 2A, one button actuator 102 is shown for convenience. However, a plurality of button actuators (not shown) may be placed along with the plurality of buttons 101.

A board 200 is disposed between the button portion 100 and the body 30. The board 200 may be a printed circuit board (PCB) that electrically connects to other components.

A switch 201 (one is shown; however, multiple switches may be provided) is provided, that convexly protrudes on a surface of the board 200. The switch 201 is operated along with a corresponding button actuator 102, and communicates data. The number of the switches may be identical to the number of the buttons 101.

The switch 201 may be a metal dome switch, which is a kind of elastic switch. Thus, if a button is activated in a state that the switch 201 and the button actuator 102 are vertically arranged in series, the button actuator 102 provided below the pressed button 101 activates the switch 201. The pressed switch 201 shorts a circuit of the board, and thus communicates data. Since the switch 201 may be elastic, an original position may be returned to if a button 101 is released.

The board 200 is fixed to a guide 203 provided in the body 30 and may be slid into and out of the body 30. The board 200 may be slid into and out of the body 30 relative and along with the sliding movement of the front portion 20.

If the front portion 20 and the body 30 are in a closed position, the board 200 is positioned at a first location that is at a rearmost side in the body 30.

Referring to FIG. 2B, in a state that the board 200 is at the first location, the button actuator 102 and the switch 201, corresponding to each other, are horizontally arranged in parallel with each other. Thus, the width 't' of the button portion 100 and the board 200 is reduced from a state in which the button actuator 102 and the switch 201 are vertically arranged with each other, and as a result the terminal 10 may be designed to have a smaller thickness.

The front portion 20 is formed to be selectively coupled to and/or separated from the board 200. In order to selectively couple and/or separate the front portion 20 and the board 200 to/from each other, attachment members are respectively provided to the front portion 20 and the board 200 to accomplish selective coupling and/or separation.

Referring to FIG. 2A, a coupling body 210 is provided at the upper surface of the board 200 near the front end portion as an attachment member.

The coupling body 210 may be a leaf spring (see FIG. 5) having a defined width, and may include an inclined portion 211 inclined from the front side to the rear side of the board 200, and a support 212 vertically extending downwards from an end of the inclined portion 211 closer to the front side of the board 200.

Referring to FIG. 2A, while the board 200 is at the first location, the coupling body 210 is pressed by the surface of the front portion 20 adjacent to the body 30, and thus the coupling body 210 stores an elastic force caused by the pressing.

A coupling groove 22 is provided at the surface of the front portion 20 adjacent to the body 30, near the rear end portion as an attachment member, so that the coupling body 210 may be coupled to the coupling groove 22. The coupling groove 22 has a shape capable of fitting, and thus may be similar to that of the coupling body 210. For example, the coupling groove 22 has an inclined surface 24 on which the inclined portion 211 of the coupling body 210 may be engaged to, and a vertical surface 23 on which the support 212 may be engaged to.

Figure 3A:
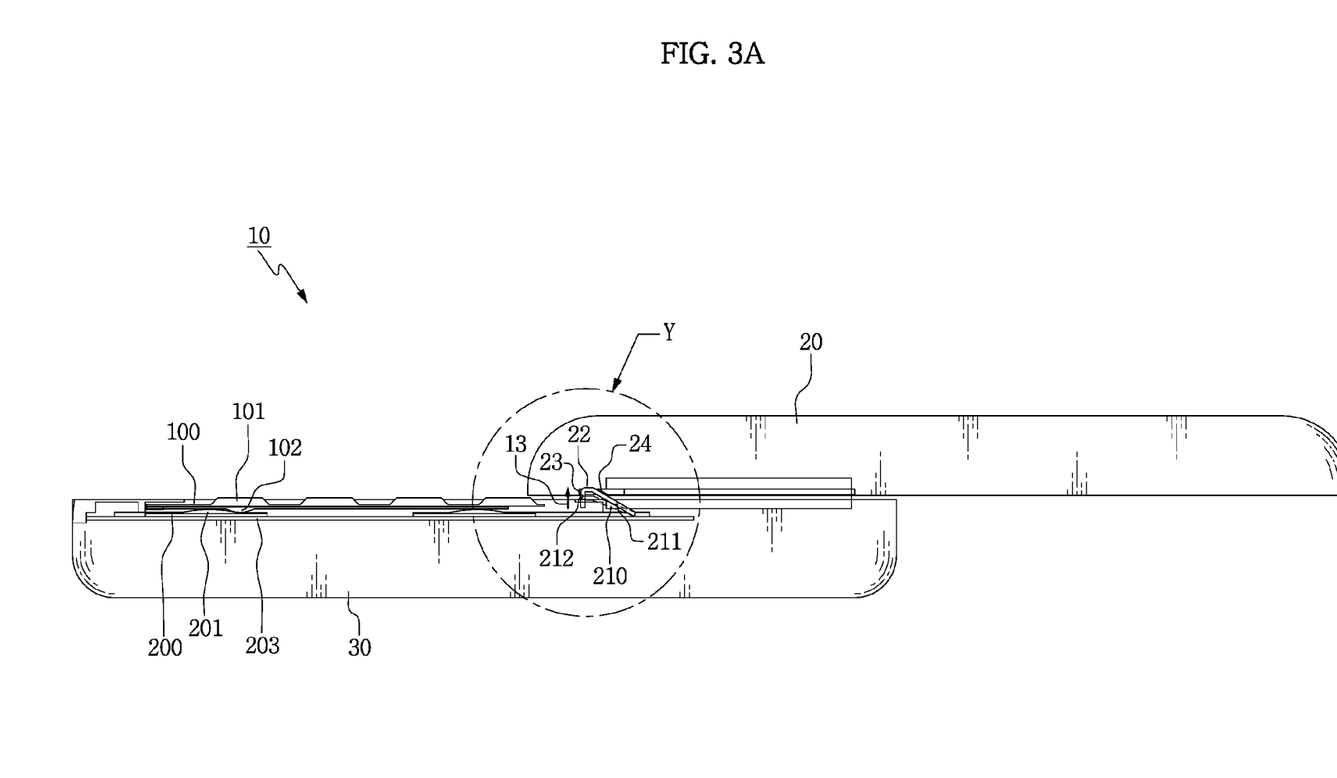
FIG. 3A is a side view of the mobile communication terminal according to an exemplary embodiment.
Figure 3B:
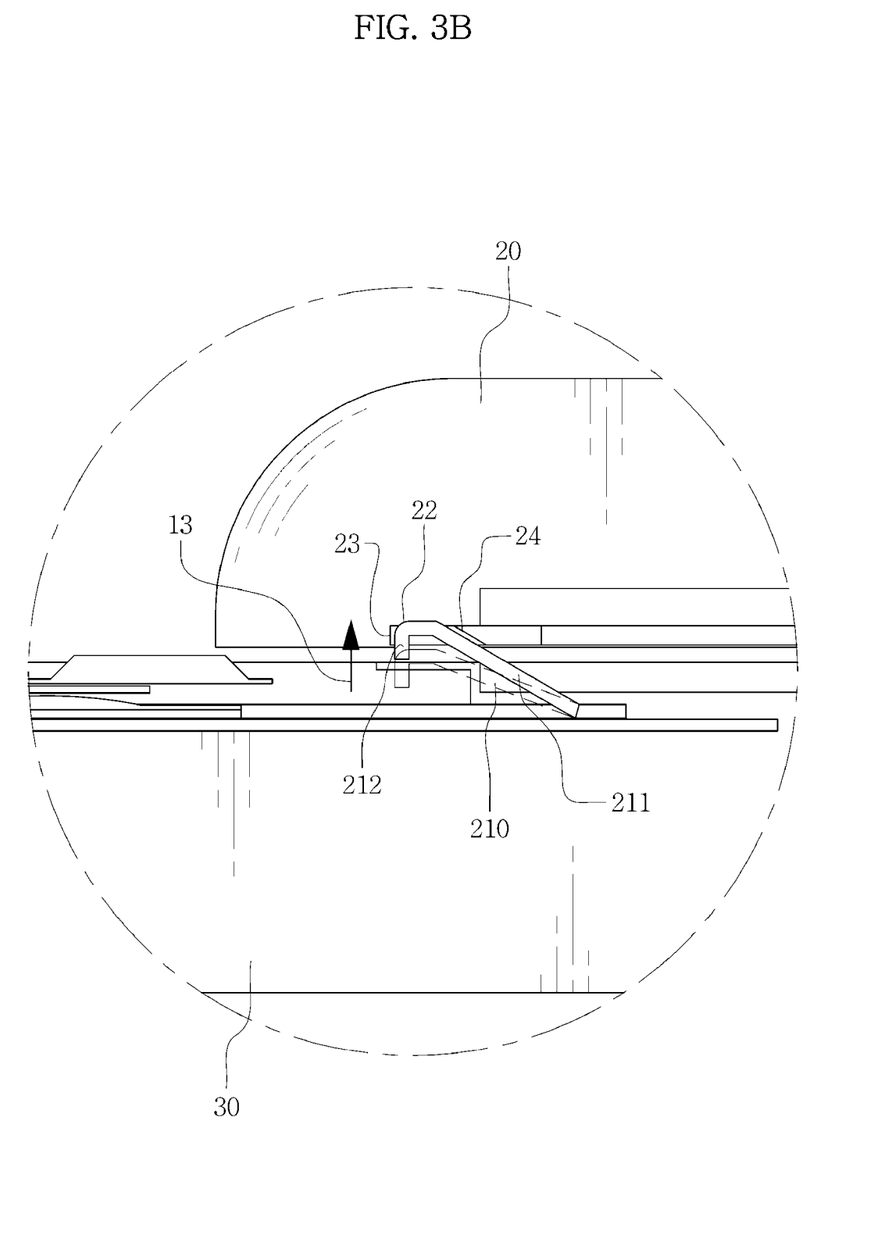
FIG. 3B is an enlarged view of a portion of a side view of the mobile communication terminal according to an exemplary embodiment.

FIG. 3A is a side view of the mobile communication terminal according to an exemplary embodiment, and FIG. 3B is an enlarged view of a portion of a side view of the mobile communication terminal according to an exemplary embodiment.

In order to operate the mobile communication terminal 10, the front portion 20 is slid forward in direction 12. The coupling body 210 keeps pressed by the surface of the front portion 20 adjacent to the body 30, until the coupling groove 22 of the front portion 20 reaches the upper portion of the coupling body 210. Since the board 200 is moved during the sliding movement of the front portion 20, the board 200 is maintained at the first location. Thus, the button actuator 102 and the corresponding switch 201 are still arranged horizontally and in parallel with each other, and the plurality of buttons 101 of the button portion 100 do not block the movement of the front portion 20 while the front portion 20 is moving.

Referring to FIG. 3A, while the front portion 20 is being slid, the coupling groove 22 is positioned above the coupling body 210. As shown in FIG. 3B in detail, if the coupling groove 22 is located above the coupling body 210, the coupling body 210 pressed by the lower surface of the front portion 20 is elastically moved in direction 13, and coupled with the coupling groove 22.

The location of the front portion 20 at the instant that the coupling body 210 is coupled to the coupling groove 22 is defined as a "dead point".

While the front portion 20 moves from the closed location (see FIG. 2A) to the dead point, the board 100 may be fixed at the first location, and may still be within the body 30.

If the front portion 20 is slid forward at the dead point, the board 200 is pulled by the front portion 20 and slid forward.

In detail, if the front portion 20 is slid forward at the dead point, the vertical surface 23 of the coupling groove 22 pushes the support 212 of the coupling body 210. As the support 212 is pushed forward, which causes the coupling body 210 to move forward, causing the board 200 to also slide forward.

Figure 4A:
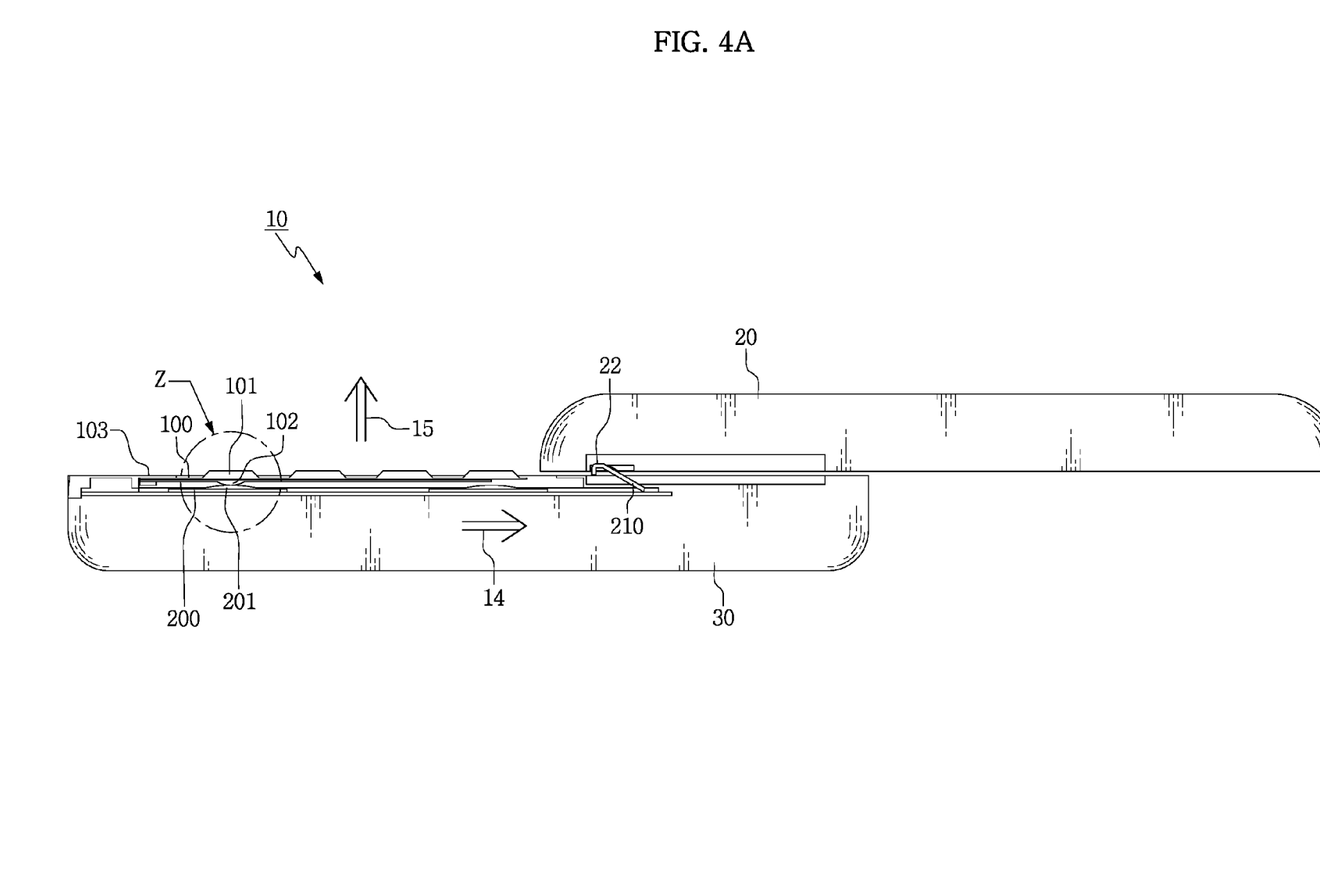
FIG. 4A is a side view of the mobile communication terminal according to an exemplary embodiment.
Figure 4B:
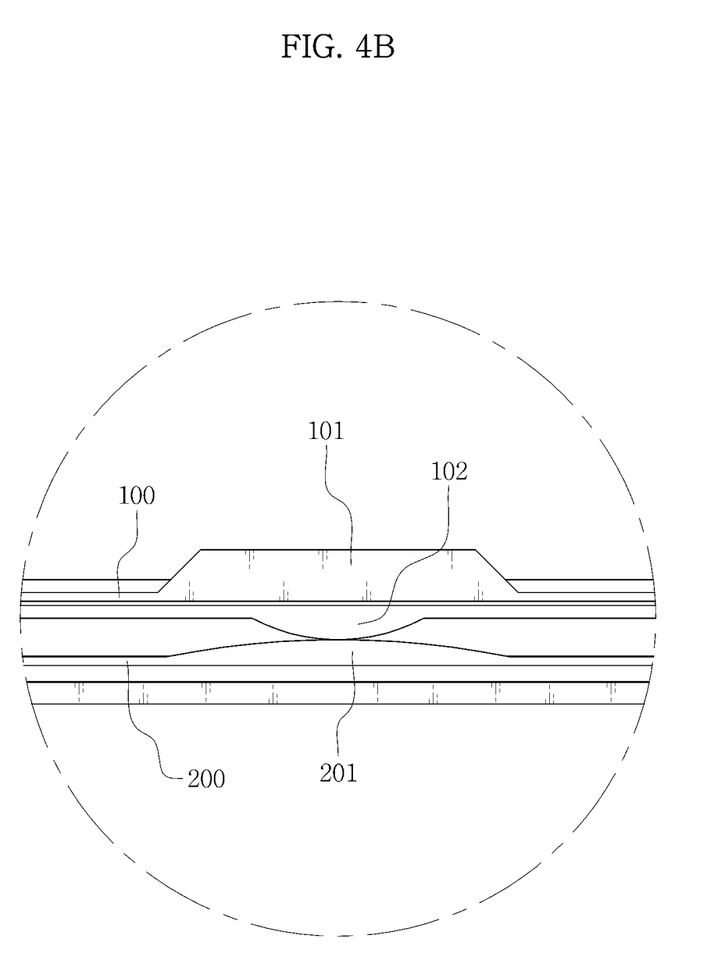
FIG. 4B is an enlarged view of a portion of a side view of the mobile communication terminal according to an exemplary embodiment.

FIG. 4A is a side view of the mobile communication terminal according to an exemplary embodiment, and FIG. 4B is an enlarged view of a portion of a side view of the mobile communication terminal according to an exemplary embodiment.

Referring to FIG. 4A, if the front portion 20 is slid over the dead point to open the body 30, the board 200 is slid in direction 14 along with the movement of the front portion 20. This position in this disclosure is referred to as a second location, and is the foremost position of the front portion 20 relative to the body 30. Thus, the opposite ends of the body 30 and the front portion 20 are the furthest away from the each other at the second location.

Referring to FIG. 4B, if the board 200 is positioned at the second location, the button actuator 102 of the button portion 100 and the corresponding switch 201 are vertically arranged in series.

Thus, the button portion 100 moves upwards (in direction 15) and protrudes over the surface of the body 30 adjacent to the front portion 20, versus the position of the board 200 at the first location. For this purpose, a connection portion 103 of the button portion 100 connected to the body 30 is elastically bendable.

Since the button portion 100 protrudes to a specific height, the buttons 101 of the button portion 100 may be accessed more readily.

If the front portion 20 is slid backwards, the inclined portion 211 of the coupling body 210 is softly engaged by the inclined surface 24 of the coupling groove 22, thereby releasing the coupling state of the coupling body 210 and the coupling groove 22.

The coupling body 210 and the coupling groove 22 are used as the attachment members for coupling or separating the front portion 20 and the board 200 to/from each other. However, the disclosure is not limited thereto. Any attachment unit with a structure capable of being coupled or separated to/from each other by a mechanical or electric action, and to selectively couple or separate the front portion 20 and the board 200 to/from each other may be used as the attachment member disclosed herein.

Figure 5:
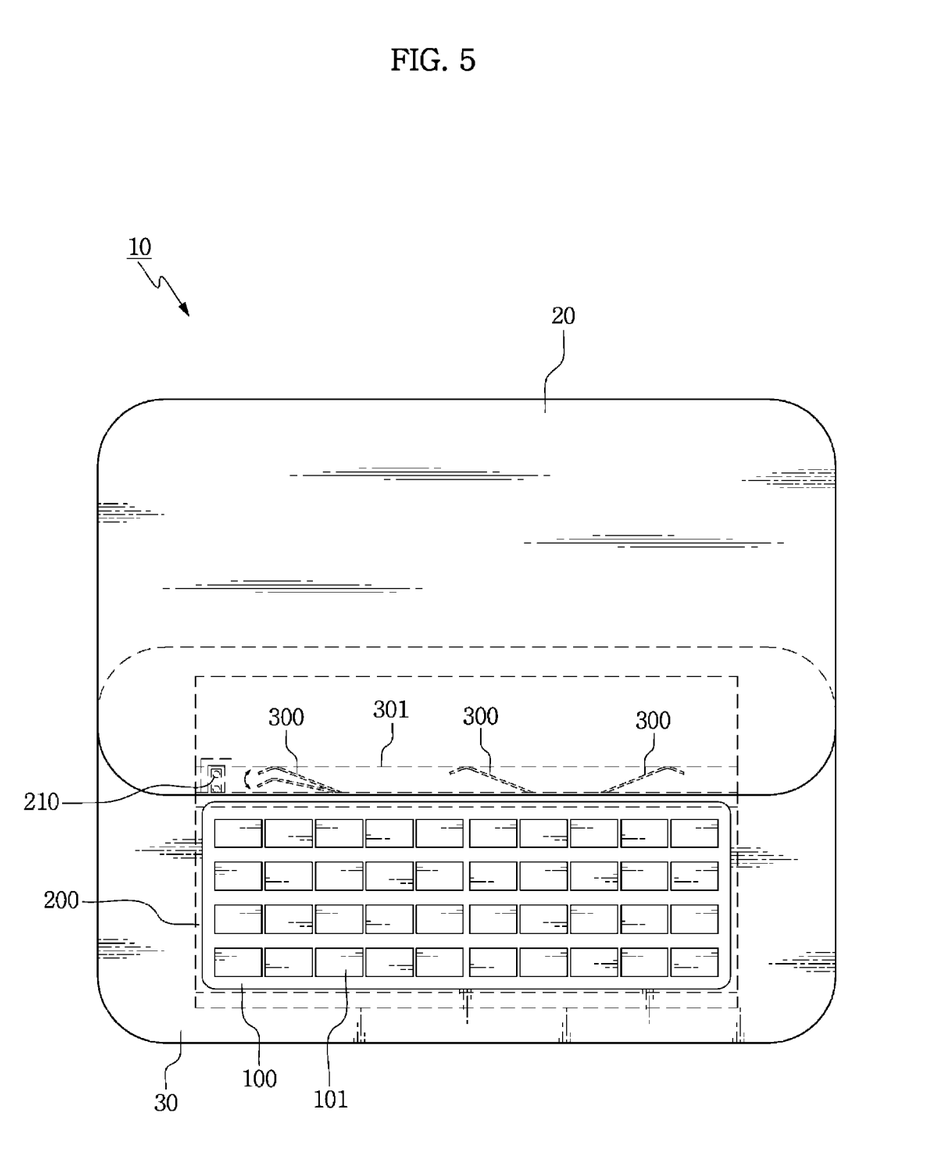
FIG. 5 is a plan view of the mobile communication terminal according to an exemplary embodiment.

FIG. 5 is a plan view of the mobile communication terminal according to an exemplary embodiment. Elements of the body 30 depicted by dotted lines are seen through.

Referring to FIG. 5, elastic body 300 (three are used in this example) provides an elastic force in a sliding direction of the board 200 are provided at the front end of the board 200. In FIG. 5, one end of an elastic body 300 is fixed to the front end side of the board 200 so that this elastic body 300 may be elastically deformed in the sliding direction (see the leftmost elastic body in FIG. 5).

In addition, the body 30 has an inner sidewall 301, and at the other end, an elastic body 300 not connected to the board 200 makes contact with the inner sidewall 301.

Figure 6A:
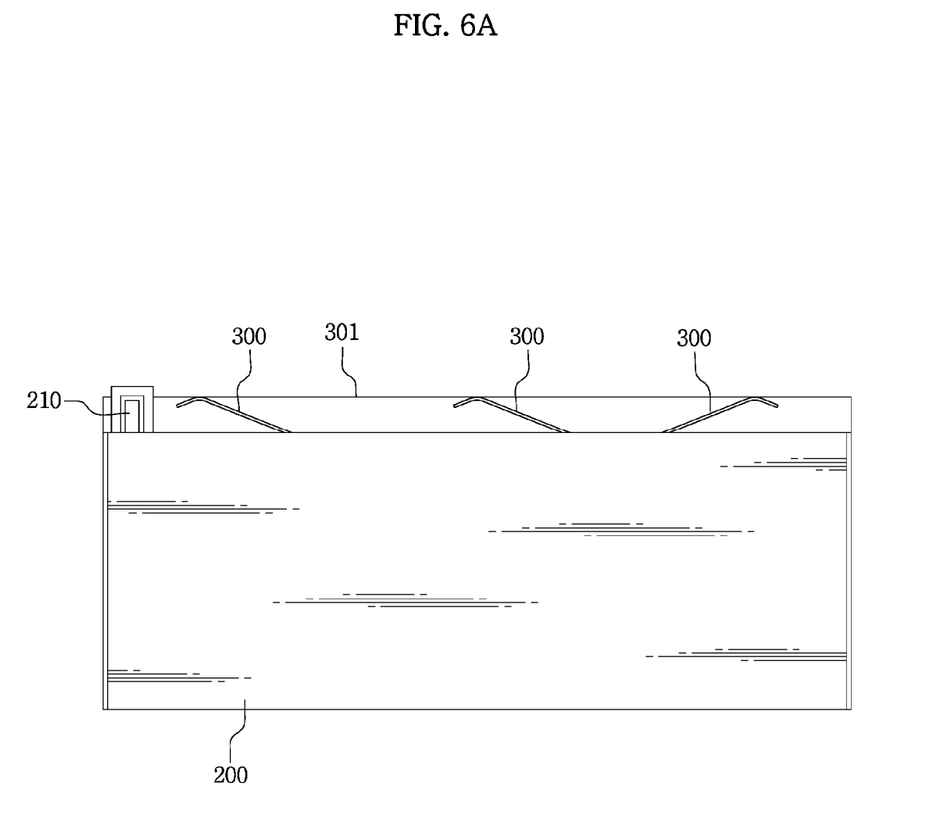
FIG. 6A shows a position of a board according to an exemplary embodiment.

FIG. 6A shows a position of a board according to an exemplary embodiment.

During the front portion 20 moving from the state of the body 30 being closed (see FIG. 2A) to the dead point (see FIG. 3A), the board 200 is positioned at the first location. At this time, as shown in FIG. 6A, the elastic body supports the inner sidewall 301 with a specific strength so that the board 200 may be fixed at the first location.

Figure 6B:
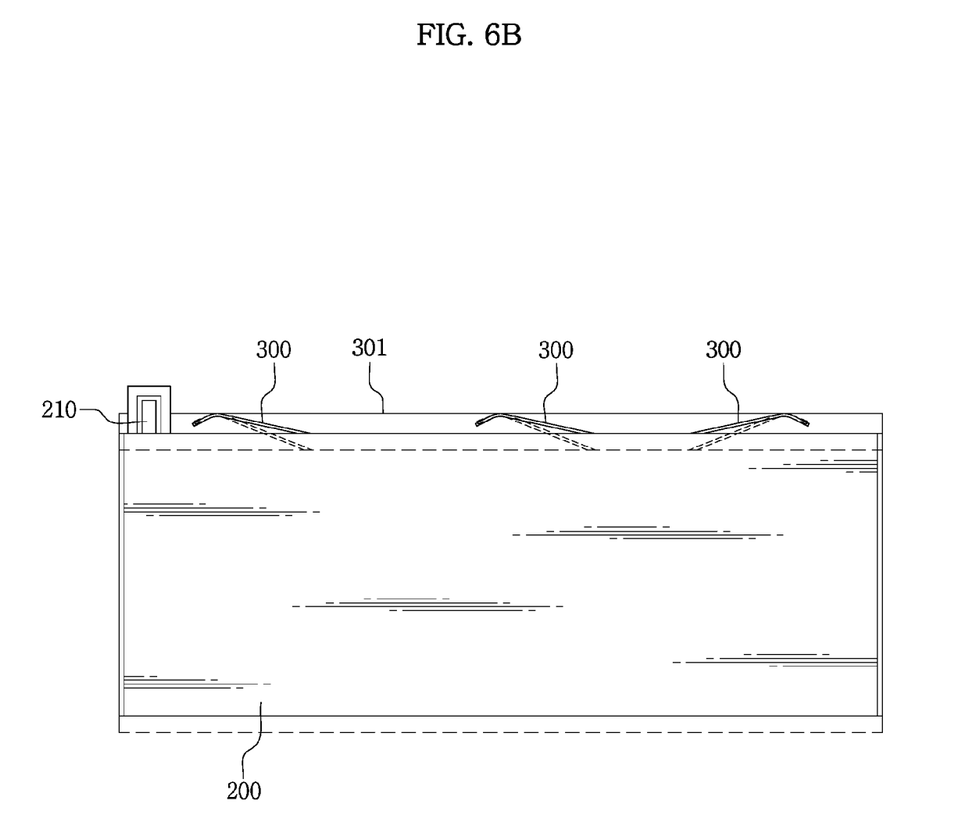
FIG. 6B shows a position of a board according to an exemplary embodiment.

FIG. 6B shows a position of a board according to an exemplary embodiment.

If the front portion 20 is slid over the dead point to the body 30 being exposed fully (see FIG. 4A), the board 200 is to a second location (the dotted line represents the board 200 positioned at the first location). Referring to FIG. 6B, the distance between the front end of the board 200 and the inner sidewall 301 is decreased at the second location, so that the elastic body 300 is engaged by the inner sidewall 301 to store an elastic restoring force.

Figure 6C:
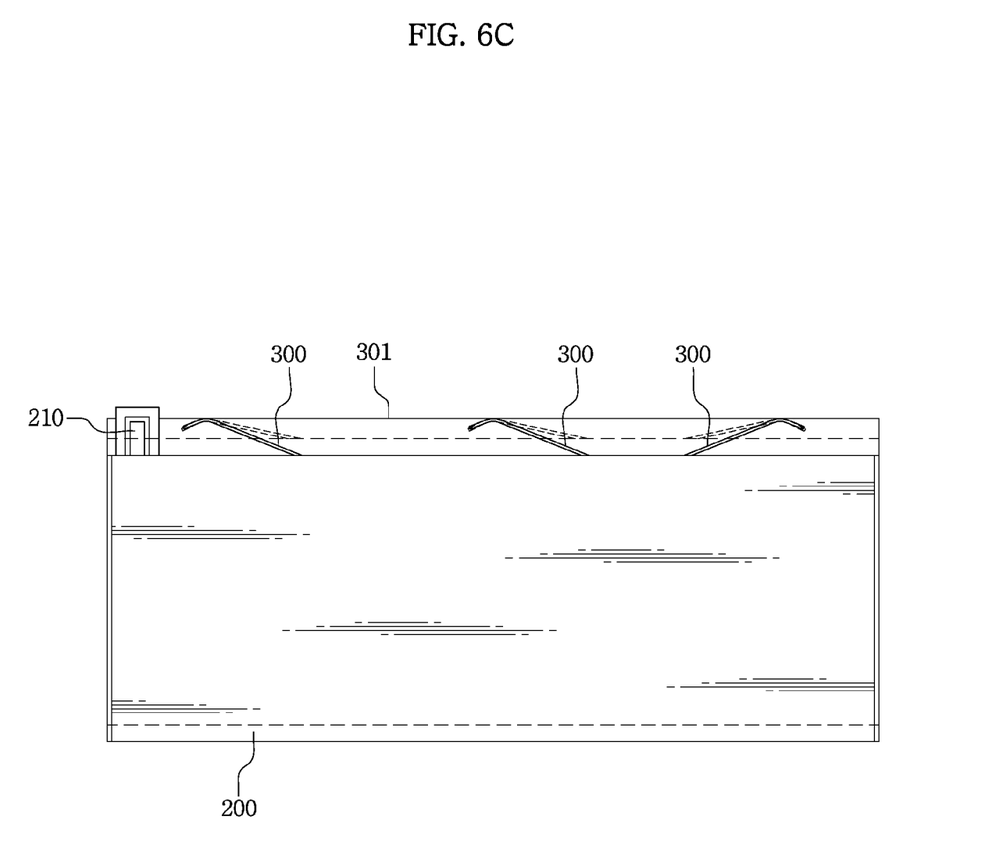
FIG. 6C shows a position of a board according to an exemplary embodiment.

FIG. 6C shows a position of a board according to an exemplary embodiment.

Referring to FIG. 6B, the front portion 20 is slid backwards from the second location, the coupling body 210 is separated from the coupling groove 22. Thus, the coupling of the front portion 20 and the board 200 is released so that the force restricting the board 200 to the second location is no longer applied. Thus, referring to FIG. 6C, the elastic body 300 returns to its original form due to the elastic restoring force, and pushes the board 200 back to the first location. This force allows the board 200 to automatically return to the first location (the dotted line represents the board which was positioned at the second location).

By using this configuration, if the front portion 20 is slid backwards from a state that the front portion 20 is open fully with respect to the body 30, the board 200 is slid to the first location along with the movement of the front portion 20.

The elastic body 300 is fixed to the board 200. But, the present disclosure is not limited thereto. The elastic body 300 may also be fixed to the inner sidewall 301. Also, the elastic body 300 is not limited to a leaf spring, and any elastic member capable of providing an elastic and/or stored force in a moving direction of the board 200 may be used as the elastic body 300 disclosed herein.

The mobile communication terminal 10 may include a sensor (not shown) for determining whether the coupling body 210 is coupled to the coupling groove 22.

If it is determined by the sensor (not shown) that the coupling body 210 is coupled to the coupling groove 22, the display 21 of the mobile communication terminal 10 is activated and allowed to be operated on. If it is determined that the coupling body 210 is separated from the coupling groove 22, the display 21 is inactivated or the device is placed in a sleep state. This sensor may be a contact sensor that determines whether the coupling body 210 contacts the coupling groove 22. However, the sensors described in this disclosure are not limited hereto, and other sensors may be used.

The board 200 is slid with respect to the body 30 in association with the sliding movement of the front portion 20. But, the present disclosure is not limited thereto. For example, the board 200 may be fixed to the body 30, and the button portion 100 may be slid with respect to the body 30.

Thus, the button portion 100 may be vertically movable with respect to the body 30 according to an opening/closing operation of the front portion 20, while the button portion 100 is slid with respect to the body 30 in the same direction as the moving direction of the front portion 20 in association with the sliding movement of the front portion 20.

According to the present disclosure, the thickness of the body may be decreased since the button portion 100 and the board 200, which influence thickness, may be arranged in parallel if a device is in a closed or folded state. Also, since the button portion 100 protrudes with respect to the body 30 if a device is opened or unfolded, the device becomes easier to operate.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A mobile communication terminal, comprising:
    a front potion;
    a body that comprises:
        a button portion comprising a button actuator protruding from a surface of the button portion that faces the body,
        a board disposed in between the button portion and the body, and
        a switch disposed on the board to face the button portion,
    wherein the button portion and the board are coupled with the body, and slide with respect to the body if the front portion is slid, and
    wherein the switch and the button actuator are horizontally arranged and parallel with each other if the front portion and the body are at a closed state, and the switch and the button actuator are vertically arranged and in series with each other, if the front portion and the body are in an open state, and
    wherein the button portion is vertically movable with respect to the body according the open/closed state.

2. The mobile communication terminal according to claim 1, wherein
    one end of the button portion is fixed to the body,
    the board is slidably fixed to the body, and
    if the front portion is slid in a first direction, the board slides with respect to the body in the first direction.

3. The mobile communication terminal according to claim 2, wherein
    the front portion is coupled to the board in an engaged state and is separated from the board in a disengaged state, and
    in the engaged state, the board is slid if the front portion is slid.

4. The mobile communication terminal according to claim 3, further comprising:
    a coupling body disposed at a surface of the board that faces the front portion, the coupling body being vertically elastic with respect to the body;
    a coupling groove disposed at a surface of the front portion that faces the body,
    wherein, if the front portion is slid so that the coupling body and the coupling groove are aligned, the coupling body is capable of being engaged with the coupling groove due to elasticity, and
    if the coupling body and the coupling groove are engaged and the front portion is slid further in a direction of the open state, the board slides along with the front portion.

5. The mobile communication terminal according to claim 4, wherein
    the coupling body is disposed on a front upper surface of the board, and
    the coupling groove is disposed in a rear lower surface of the front portion.

6. The mobile communication terminal according to claim 4, wherein
    the coupling body is a leaf spring having an inclined portion from a first side of the body to a second side of the body, and a support portion vertically extending downwards from an end of the inclined portion,
    the coupling groove has an inclined surface and a vertical surface, and
    if the coupling body and the coupling groove are engaged, if the front portion is moved in a direction of the open state, the vertical surface prevents the coupling body from being slid, and if the front portion is moved in a direction of the closed stated, the inclined portion is pressed by the inclined surface to release the coupling body from being engaged to the coupling groove.

7. The mobile communication terminal according to claim 6, further comprising:
    an elastic body to provide an elastic force in a sliding direction of the board at a rear end surface of the board, the elastic body contacting an inner sidewall of the body,
    the elastic body is compressed to store an elastic restoring force in an open state, and
    if the front portion is moved so that the coupling body is separated from the coupling groove, the board is slid backwards due to the elastic restoring force.

8. The mobile communication terminal according to claim 4, further comprising:
    a sensor to determine a coupling state of the coupling body and the coupling groove;
    a display unit,
    wherein, if the sensor determines that the coupling body and the coupling groove are engaged, the display unit is activated.

9. A moveable button portion for a device, comprising:
    a button attached to the moveable button portion at a first state of the device; and a leaf shaped coupling body to couple the button portion to the device, wherein the button comprises an actuator of a same shape of a switch of the device corresponding to the actuator, and the actuator and switch being horizontal and in parallel with each other in the first state, and if the device transitions from the first state to a second state, the moveable button portion also moves and the switch and the actuator become vertical and in series with each other.

10. The moveable button portion according to claim 9, wherein the leaf shaped coupling body uses elastic forces to couple.

11. The moveable button portion according to claim 9, wherein the device is activated in the second state and turned off in the first state.

12. The moveable button portion according to claim 9, wherein the leaf shaped coupling body engages with a coupling groove of the device in the second state.

* * * * *